N. GEAR.
Potato-Digger.
No. 21,413. Patented Sept. 7, 1858.
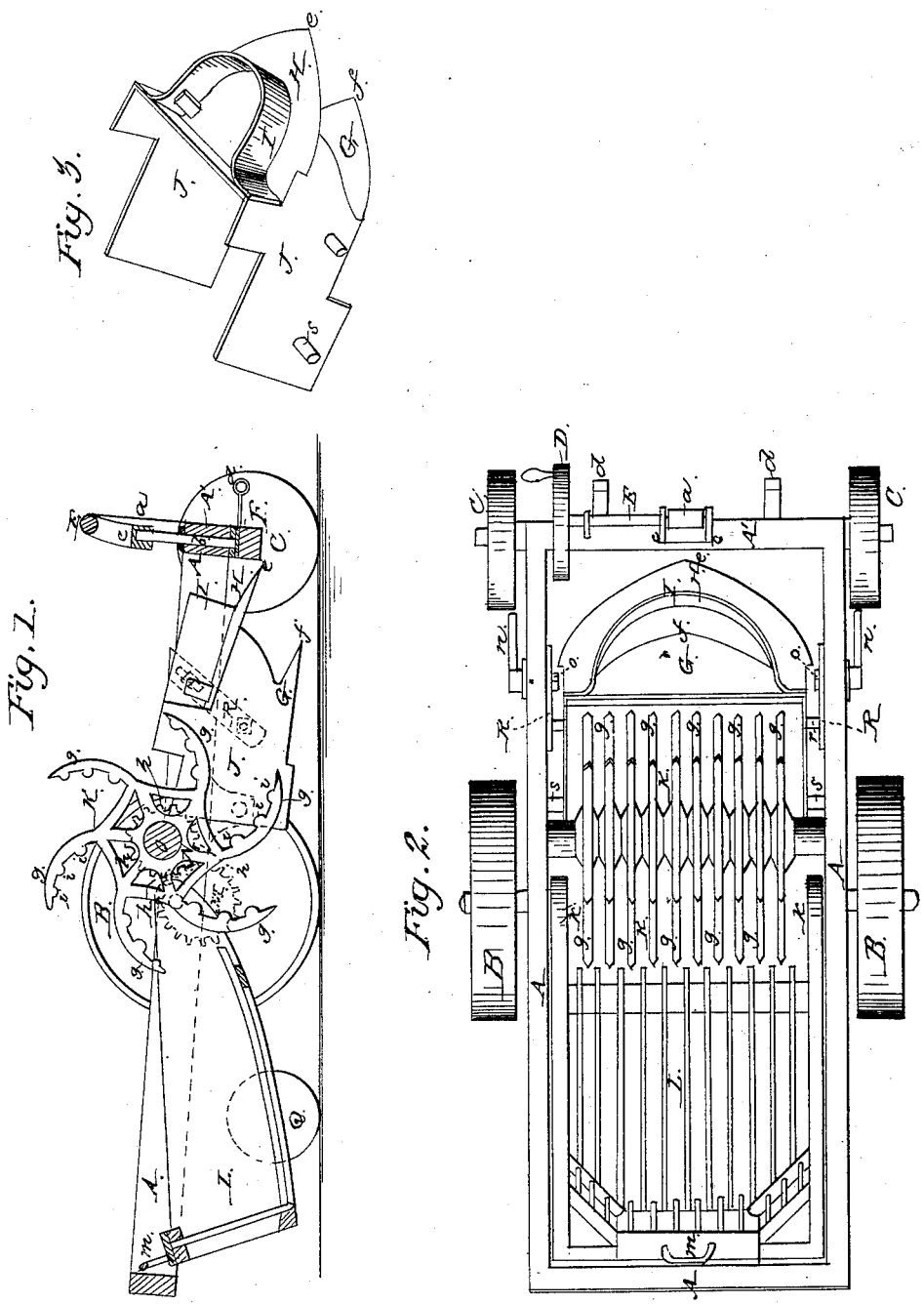

UNITED STATES PATENT OFFICE.

NATHANIEL GEAR, OF ZANESVILLE, OHIO.

IMPROVEMENT IN MACHINES FOR DIGGING POTATOES.

Specification forming part of Letters Patent No. 21,413, dated September 7, 1858.

*To all whom it may concern:*

Be it known that I, NATHANIEL GEAR, of Zanesville, in the county of Muskingum and State of Ohio, have invented certain new and useful Improvements in Machines for Digging and Gathering Potatoes; and I do hereby declare the following to be a full, clear, and exact description of the construction and operation of the same, reference being had to the accompanying drawings, making a part of this specification, in which—

Figure 1 represents a longitudinal vertical section through the machine. Fig. 2 represents a top plan, and Fig. 3 represents a perspective view of the digging-scoop with its cover detached from the machine.

Similar letters of reference, where they occur in the separate figures, denote like parts of the machine in all of them.

The nature of my invention relates more especially to the construction and operation of the scoop for digging and the skeleton wheel for gathering and sifting out the earth, &c., previous to its delivering the potatoes in the receptacle behind it.

To enable others skilled in the art to make and use my invention, I will proceed to describe the construction and operation of the machine in connection with the drawings.

A is a frame, supported on a pair of carrying and driving wheels, B B, the front part of said frame being supported on a pair of truck-wheels, C C, and so connected therewith that by means of a hand-wheel, D, on the end ot a shaft, E, and a chain, cord, or band, *a*, the said frame A may be raised up and supported on the truck, both to raise or depress the scoop and to allow the truck-wheels to run under said frame, so that it may be turned short around. The king-bolt *b* is fastened to the axle F of the truck and projects up through the front cross-piece, A', of the main frame, and upon its top is supported a yoke or pillar-block, *c c*, in which the shaft E turns. One end of the band or chain *a* is fastened to this shaft and the other end of it to the cross-piece A'. *d d* are dead-eyes, to which the shafts or tongue may be attached for drawing or guiding the machine.

To the forward part of the frame, and between its side rails, is hung the digging-scoop G, (better seen at Fig. 3,) so that it may be adjustable on said frame. Over the top of the scoop there is a shield-piece, H, with a curved flange, I, on top of it. This is for removing weeds, potato-tops, &c., and throwing them to one side out of the way of the scoop, and thus kept out of the machine. The advanced edge of the shield-piece *e* projects beyond the point *f* of the scoop, as seen better in Fig. 1, so that the row of potatoes is cleared off in advance of the digging. Immediately behind the scoop, and between the closed sides J J thereof, is placed the gathering and sifting wheel K. This wheel is composed of a series of skeleton sections, so that the wheel shall not only be open between its curved arms *g*, but also open, as at *h*, in the line of their shaft, and thus all the earth may be sifted through said opening without clogging in the wheel. The concave edge of the curved arms *g* are furnished with projections *i i i*, against which the earth and potatoes as they are gathered in strike, which breaks up into fine particles the earth and checks the potatoes until the earth drops from them. There is an almost entire and perfect separation and sifting of the earth and potatoes in the wheel K; but what earth may pass through with the crop drops through the slats of the receiving-box L behind the wheel, and into which they are thrown by said wheel. The wheel K is rapidly rotated by means of the gear-wheels M N, (in dotted lines, Fig. 1,) the former being connected to the wheels B and the latter to the shaft O of the gathering-wheel. These gear-wheels are so placed within the main wheels as not to be easily clogged up or injured by any obstruction.

In rear of the gathering-wheel K there is a receiver or box, L, into which the potatoes are thrown by the rotation of the gathering-wheel. This box is hinged or pivoted at its front part, *k k*, to the main frame, and its rear portion is supported on a pair of wheels, Q, so that the box, receiver, or cage may move independent of the movement of the main frame, the motions of each contributing to the agitation of the potatoes, and thus separating from them and sifting out any and all earth that may have passed the wheel K.

The rear portion of the box or receiver P can be opened by drawing up the slats thereof by the handle *m*, so that when sufficient has been gathered in the receiver they may be dropped therefrom in a pile, or the rear part may be left open and the crop dropped along on the row.

The operation of the machine will be obvious from the above description. The machine has been practically tested and operates perfectly. When the scoop is to be lowered or raised for penetrating the ground to a greater or less depth, the hand-nuts n n are turned to loosen the ends of the suspension straps or bars R, which can then be raised or lowered, and when adjusted again tightened by the screw-threads o o. The scoop has trunnions r r upon it, which rest in the ends of these suspension-bars R. The rear of the scoop has also supports S S upon it, by which it is firmly held to the frame. When the front of the scoop is raised or lowered it swings or pivots on these supports S.

Having thus fully described the nature and object of my invention, what I claim therein as new, and desire to secure by Letters Patent, is—

In combination with the scoop for digging, the skeleton wheel K for gathering, carrying, sifting, and delivering the potatoes into the box or receiver, substantially as herein described and represented.

NATHANIEL GEAR.

Witnesses:
A. B. STOUGHTON,
THOS. H. UPPERMAN.